United States Patent
Nitsche et al.

(10) Patent No.: US 6,254,818 B1
(45) Date of Patent: *Jul. 3, 2001

(54) METHOD OF TREATING ELASTIC MATERIALS THAT ARE PROVIDED WITH SILICA EMBEDMENTS

(75) Inventors: Werner Nitsche, Lippstadt; Norbert Lahme; Günter Sassmannshausen, both of Brilon, all of (DE)

(73) Assignee: Accumulatorenwerke Hoppecke Carl Zoellner & Sohn GmbH & Co. KG (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,963

(22) PCT Filed: Apr. 22, 1997

(86) PCT No.: PCT/EP97/02017

§ 371 Date: Mar. 9, 1998

§ 102(e) Date: Mar. 9, 1998

(87) PCT Pub. No.: WO98/01911

PCT Pub. Date: Jan. 15, 1998

(30) Foreign Application Priority Data

Jul. 9, 1996 (DE) .............................................. 196 27 615

(51) Int. Cl.$^7$ ...................................................... B29C 71/02
(52) U.S. Cl. ............................................................. 264/345
(58) Field of Search ................................... 264/345, 344, 264/346, 347, 331.11, 331.15

(56) References Cited

U.S. PATENT DOCUMENTS

| 3,953,565 | * | 4/1976 | Mizutani et al. ............... 264/129 |
| 4,093,515 | | 6/1978 | Kolobow . |
| 4,288,503 | * | 9/1981 | Goldberg ............................. 429/145 |
| 4,824,499 | | 4/1989 | Kagawa . |

FOREIGN PATENT DOCUMENTS

| 2629236 | 1/1977 | (DE) . |
| 0648802 | 4/1995 | (EP) . |
| 9116733 | 4/1961 | (WO) . |

* cited by examiner

Primary Examiner—Leo B. Tentoni
(74) Attorney, Agent, or Firm—Robert W. Becker & Associates

(57) ABSTRACT

The invention relates to a method of treating elastic material that is provided with silica embedments to avoid shrinkage, whereby the finished material that is provided with the silica embedments is subjected for a prescribed period of time to temperatures above 40° C. prior to further processing.

7 Claims, 1 Drawing Sheet

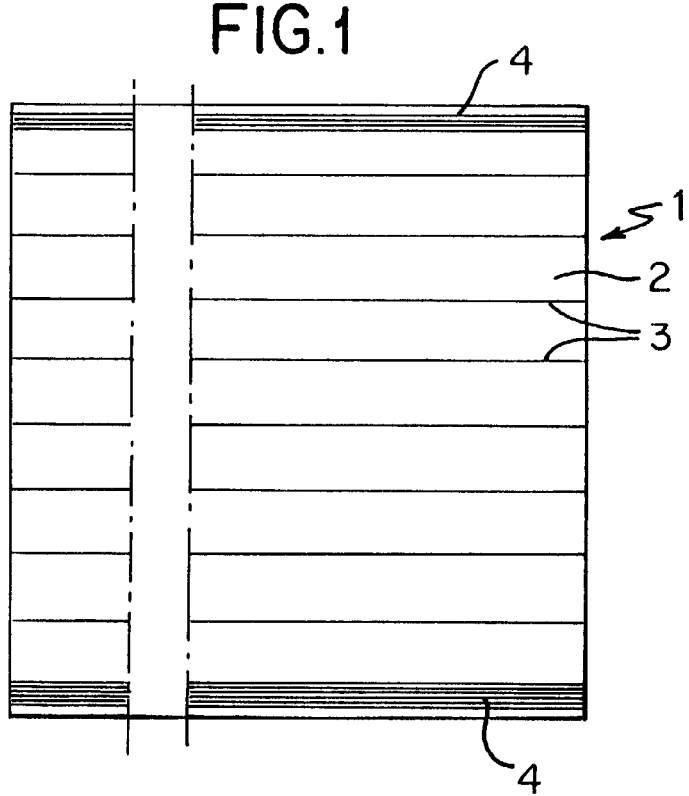
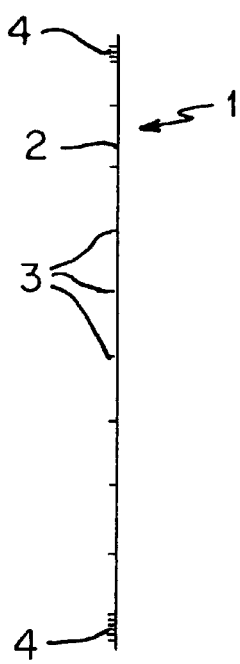

METHOD OF TREATING ELASTIC MATERIALS THAT ARE PROVIDED WITH SILICA EMBEDMENTS

BACKGROUND OF THE INVENTION

The present invention relates to a method of treating elastic materials that are provided with silica embedments.

It is known in the state of the art in many technical applications to provide elastic or elastomeric materials, such as plastics, especially polyethylene (PE) or polyvinylchloride (PVC), as well as rubber latex or the like, with silica embedments during the manufacturing process.

During the processing of plastics this takes place for example during the extrusion process. During the later technical or industrial applications, the silica embedments assume technical functions.

One generally known application is, for example, the manufacture of separators for lead plates in the production of storage cell pores. These separators are, for example, extruded PE foils, which have, for example, ribs and in all regions silica embedments as pore formers. From such foils, separators or pockets are manufactured for the lead plates of a cell unit of a storage battery.

During the industrial applications of the elastic materials that are provided with silica embedments, the material is frequently handled in regions of very differing moisture and temperatures. Thus, the elastic materials with the silica embedments are on the one hand subjected to processes where they absorb moisture and on the other hand are subjected to processes where they are dried. This leads to an undesired shrinking during the drying process.

Starting from this state of the art, it is an object of the present invention to provide a method of treating elastic materials that are provided with silica embedments which makes it possible to minimize or avoid shrinkage.

SUMMARY OF THE INVENTION

For the technical realization of this object, it is proposed that the finished material that is provided with the silica embedments be subjected prior to or during the further processing to temperatures above 40° C. for a prescribed period of time.

It was surprisingly discovered that such a thermal treatment can prevent later shrinkage resulting from drying of the material.

It is advantageously proposed that the material be subjected to temperatures of about 100° C. for a prescribed period of time. This temperature range has shown to be particularly effective.

A time period of 24 to 48 hours has been shown to be advantageous as a prescribed period of time.

It is particularly advantageous for the elastic material that is provided with the silica embedments to be subjected in the form of rolls of foils to the appropriate temperature for the prescribed period of time. This proposal of the method enables the simple integration of the treatment process into the known production and processing stages. Customarily, the plastic material, such as PE, is first manufactured and extruded. The silica embedments are customarily produced in this method step. The finished sheet or strip can then be rolled up and can be subjected to the treatment temperature in the roll form of the foil, or can first be delivered in order to then be subjected before the actual use to the desired temperature for the prescribed period of time.

It is proposed in a particularly advantageous manner to treat the material that is provided with silica embedments with atmospheric moisture of approximately 40 to 100% during the thermal treatment, for example 8 to 24 hours. This can be effected in a steam enviroment. Pursuant to one advantageous alternative proposal of the present invention, this can be effected by soaking. It is particularly advantageous to soak the material in acids, for which purpose, for example, sulfuric acid, phosphoric acid or sulfonic acids are particularly suitable.

The present invention proposes a straightforward yet effective method for treating elastic materials that are provided with silica embedments, with this method counteracting later shrinkage.

The elasticity of the material in the context of the present invention includes at least the possibility of the shrinkage, however, is in other respects no limiting techniclogical characteristic of the finished material.

There is furthermore proposed with the present invention a foil of elastic material having silica embedments which after its manufacture is treated pursuant to the inventive method, in other words, is subjected for a prescribed period of time to temperatures above 40° C. and is possibly additionally subjected to an atmospheric moisture of about 40%.

The foil is advantageously formed of a synthetic material, particularly advantageously from PE, but alternatively also from rubber or latex.

The treatment method can be effected after the manufacture of the foil and prior to delivery thereof by the manufacturer, or after delivery by the customer, for example even shortly prior to an appropriate further processing.

BRIEF DESCRIPTION OF THE DRAWING

Further advantages and features of the present invention can be seen from the following description in conjunction with the FIGS. These show:

FIG. 1 a schematic plan view of one exemplary embodiment of a foil, and

FIG. 2 a schematic side view.

DESCRIPTION OF PREFERRED EMBODIMENTS

The Figures show one exemplary embodiment for a foil of elastic material, whereby the material is a PE foil 1 that is made available in spools or rolls; the surface region 2 thereof is structured by fin or rib-like projections 3 that extend in the longitudinal direction. From this strip-like foil, respective prescribed lengths are cut off, and after folding in the edge region 4 are interconnected. The entire surface region 2 of the foil is provided with silica embedments.

The present invention is, of course, in no way restricted to the specific disclosure of the specification and drawing, but also encompasses any modifications within the scope of the appended claims.

List of Reference Numerals

1 Strips of foils or thin sheets of PE
2 Surface region
3 Projections
4 Edge region

What is claimed is:

1. A method of treating already manufactured elastic materials that are provided with silica embedments, including the step of subjecting already manufactured, finished material that is provided with silica embedments to temperatures above 40° C. for a prescribed period of time to avoid later shrinkage of the thus treated material.

2. A method according to claim 1, wherein said material is subjected to temperatures of about 100° C. for said perscribed period of time.

3. A method according to claim 1, wherein said perscribed period of time is approximately 24 to 48 hours.

4. A method according to claim 1, wherein said elastic material that is subjected to said temperatures for a prescribed period of time is in the form of rolls of foil.

5. A method according to claim 1, wherein said elastic material is subjected to moisture for approximately 8 to 24 hours.

6. A method according to claim 5, wherein said moisture is supplied in the form of steam.

7. A method according to claims 1, wherein said elastic material is treated with acid.

* * * * *

UNITED STATES PATENT AND TRADEMARK OFFICE
CERTIFICATE OF CORRECTION

PATENT NO. : 6,254,818 B1
DATED : July 3, 2001
INVENTOR(S) : Nitsche et al.

It is certified that error appears in the above-identified patent and that said Letters Patent is hereby corrected as shown below:

<u>Title page,</u>
Item [57], should read as follows:
-- [57] ABSTRACT: A method of treating elastic materials that are provided with silica embedments is provided. This method involves subjecting finished material that is provided with the silica embedments to temperature above 40° C for a prescribed period of time prior to or during further processing. --

Signed and Sealed this

Twenty-fifth Day of June, 2002

*Attest:*

*Attesting Officer*

JAMES E. ROGAN
*Director of the United States Patent and Trademark Office*